Figure 1:
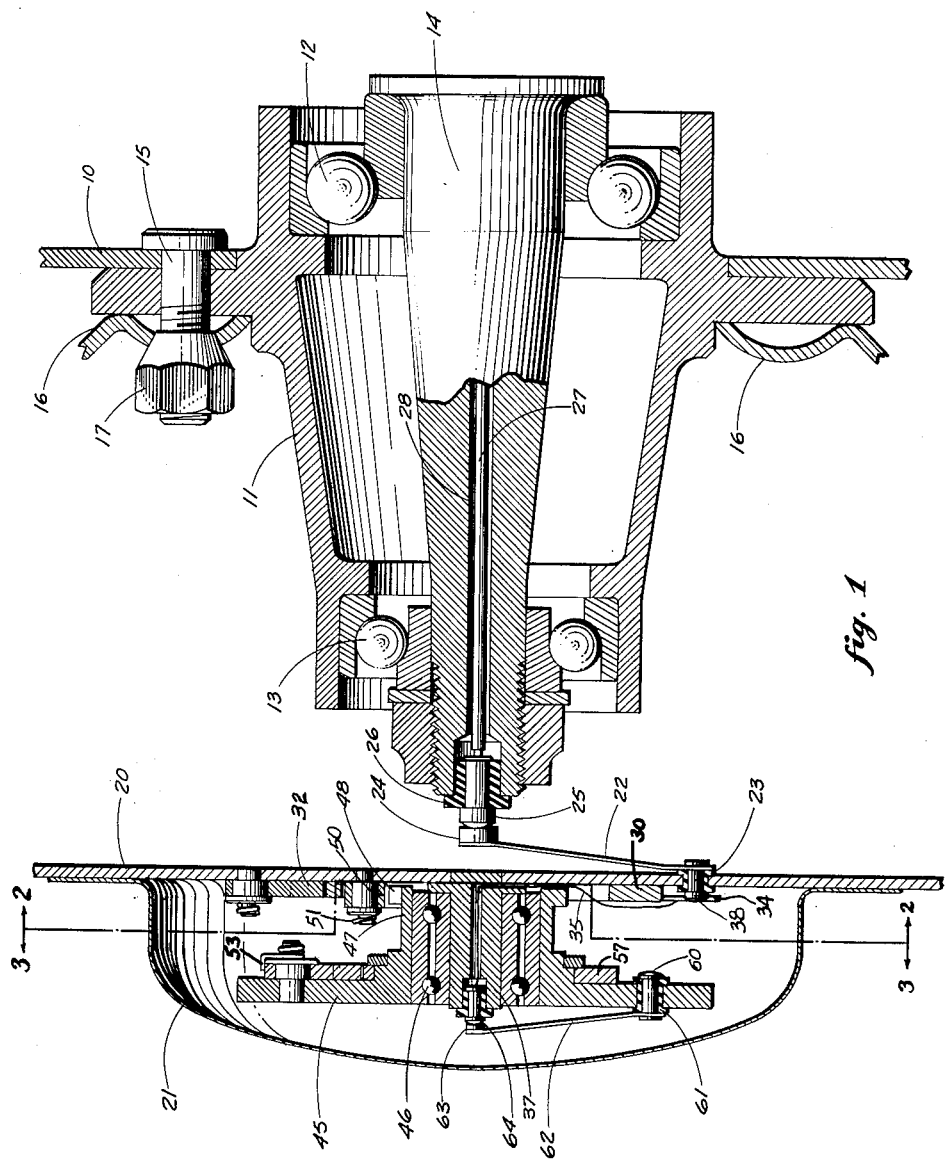

Aug. 14, 1962   J. M. ZEIGLER   3,049,381
ANTI-SKID MECHANISM
Filed Sept. 23, 1958   5 Sheets-Sheet 1

INVENTOR.
John M. Zeigler.
BY Wood, Herron & Evans.
ATTORNEYS.

Aug. 14, 1962

J. M. ZEIGLER 3,049,381

ANTI-SKID MECHANISM

Filed Sept. 23, 1958

5 Sheets-Sheet 2

INVENTOR.
John M. Zeigler.
BY Wood, Herron & Evans.
ATTORNEYS.

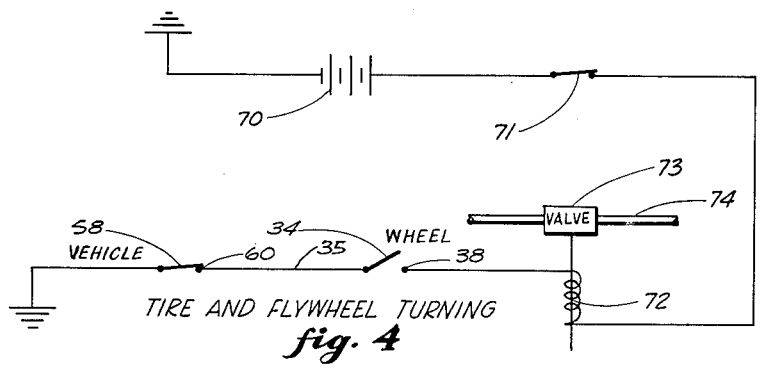
*fig. 4* — TIRE AND FLYWHEEL TURNING
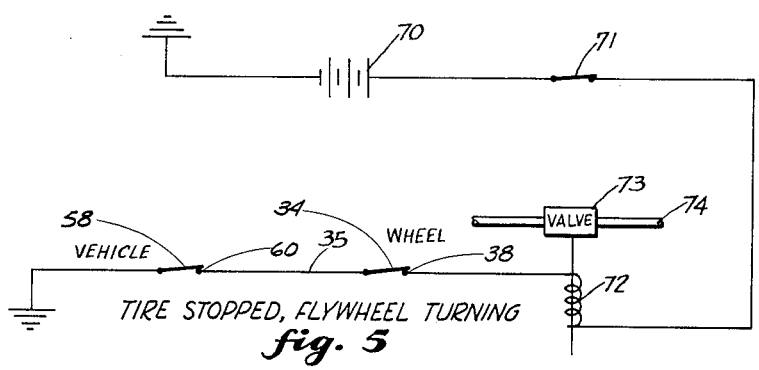
*fig. 5* — TIRE STOPPED, FLYWHEEL TURNING
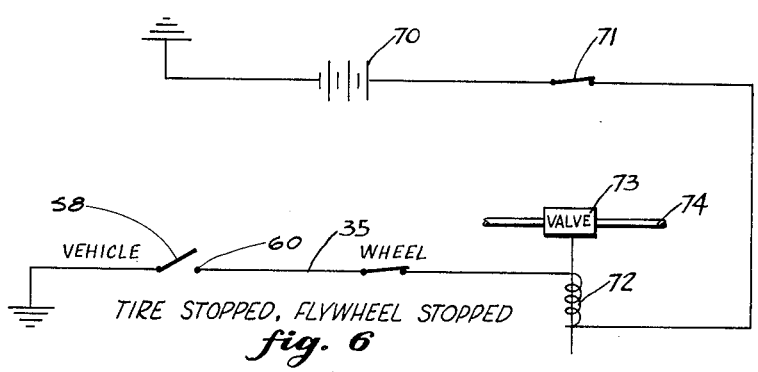
*fig. 6* — TIRE STOPPED, FLYWHEEL STOPPED Aug. 14, 1962           J. M. ZEIGLER           3,049,381

ANTI-SKID MECHANISM

Filed Sept. 23, 1958           5 Sheets-Sheet 5

INVENTOR.
John M. Zeigler.
BY Wood, Herron & Evans
ATTORNEYS.

United States Patent Office 3,049,381
Patented Aug. 14, 1962

3,049,381
ANTI-SKID MECHANISM
John M. Zeigler, Hamilton, Ohio, assignor, by mesne assignments, to Burtek, Inc., a corporation of Delaware
Filed Sept. 23, 1958, Ser. No. 762,813
7 Claims. (Cl. 303—21)

This invention relates to brake mechanisms and more particularly to an anti-skid device for controlling the application of braking pressure to prevent the locking of vehicle wheels during the application of brakes.

It is well understood that vehicles may be stopped most effectively when the wheels continue to turn even after the full application of brake pressure. It has been observed that a locked wheel skidding along the ground will leave a film of tacky, melted rubber, thus indicating that the wheel has been skidding on its own liquid or semi-liquid rubber. Thus, the coefficient of friction of the locked wheel with respect to the surface upon which it skids is considerably less than the coefficient of friction of a wheel which is rolled with respect to a highway and which continually presents a dry tire to the highway.

Further, when the wheels are locked, directional control of the vehicle is lost for the vehicle acts as though it skidding on blocks of rubber. By permitting at least some rotation in the wheels, however, directional control can be maintained.

The principal work done in the field of anti-skid mechanisms has been directed to the developing of inertia devices which are sensitive to unusual deceleration of a vehicle wheel and will effect the release of brake pressure when deceleration exceeds a predetermined amount. In addition to the difficulty of maintaining predetermined calibration of the inertia device so that its effects will be uniform regardless of weather and age conditions, the difficulty with the inertia type anti-skid mechanism is that the mechanism is difficult, if not impossible, to design to be as effective at high speeds as at low speeds.

The present invention represents a departure in basic concepts of braking and is better adapted than prior devices for meeting the requirements and conditions of actual driving practices. Instead of using an inertia or deceleration measuring system, the present invention employs a vehicle speed and wheel speed responsive system by which the brake pressure may be applied at all *wheel* speeds above a preselected minimum speed, for example, five miles an hour. Below the minimum speed, the brakes cannot be applied unless the *vehicle* speed has been reduced to a predetermined speed, such as ten miles an hour.

It has been an objective of the invention to provide an anti-skid mechanism which includes speed responsive means for detecting wheel speed, speed responsive means for detecting vehicle velocity, and a circuit associated with the speed responsive means for effecting release of braking pressure at predetermined conditions of the speed responsive means.

It has been another objective of the invention to provide an anti-skid mechanism which includes, as its main operating elements, two speed responsive means, the speed responsive means being wholly mounted within the hub cap of a vehicle wheel.

It has been another objective of the invention to provide an anti-skid mechanism which includes, as its main operating elements, two speed responsive devices; a wheel mounted wheel speed responsive device for detecting wheel speed, and a vehicle speed responsive device driven by a free running non-braked wheel.

It has been yet another objective of the invention to provide an anti-skid mechanism having, as the vehicle speed measuring device, an overrunning clutch for driving a speed responsive device. The overrunning clutch may be connected directly to a wheel or to the vehicle speedometer so as to be positively driven by means associated with the vehicle speed but upon sharp reduction of the wheel speed will continue rotating at approximately vehicle speed.

It has been still another objective of the invention to provide an anti-skid mechanism including a solenoid operated valve for releasing brake pressure, the solenoid operated valve being connected in series with two switches. One of the switches is operated to close when *vehicle* speed exceeds a predetermined amount and another switch is operated to close when *wheel* speed falls below a predetermined amount.

It has been still another objective of the invention to provide an anti-skid system having particular, although not exclusive, application to aircraft in which first speed responsive means detects vehicle speed, for example, by being mounted in association with the nose wheel of an airplane and in which second speed responsive means detects wheel speed. The two speed responsive means have contacts which are operated sequentially as the speeds of the vehicle and braked wheels are reduced. The contacts are associated in series connected pairs, the pairs being connected in parallel and the parallel connection being connected in series with a solenoid operated brake release valve. The operation of each pair of switches is inter-related so that the switches operated sequentially as the speed of the aircraft and wheel speed is reduced so that the anti-skid mechanism operates in stages related to the descending vehicle speed.

Figure 2:
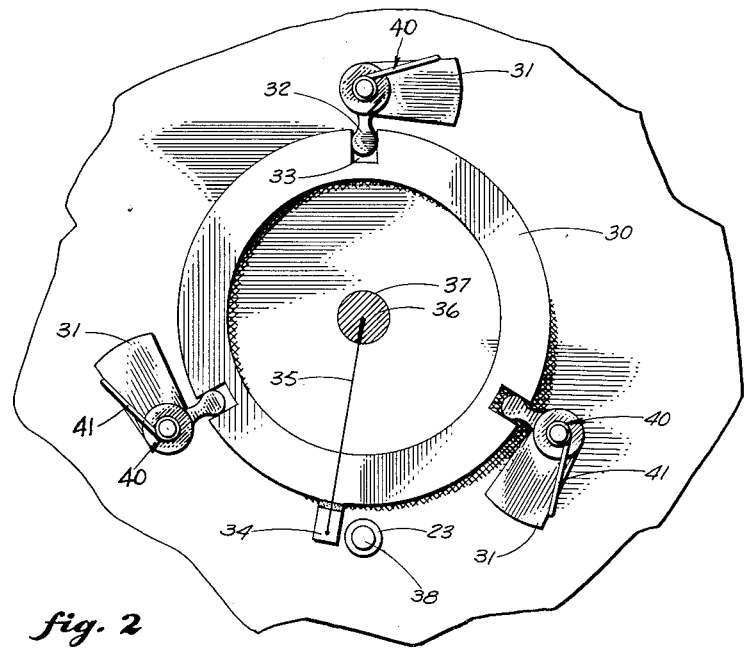
Figure 3:
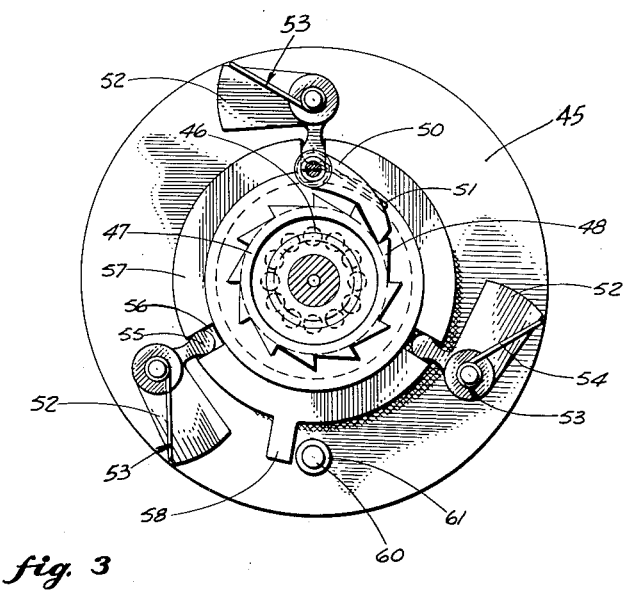
Figure 7:
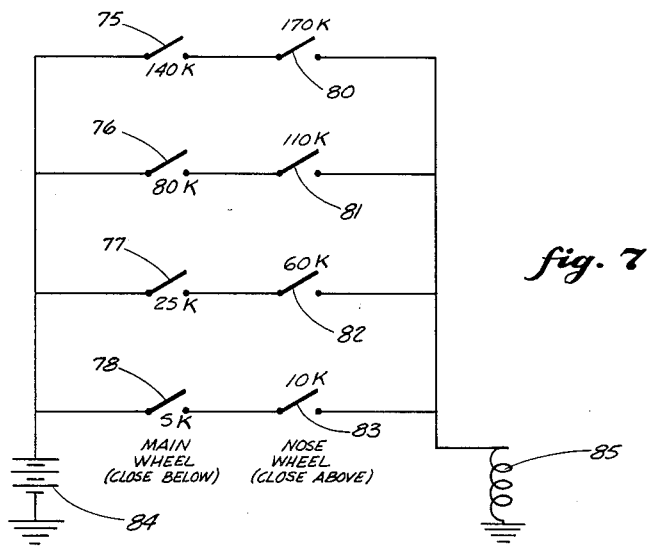
Figure 8:
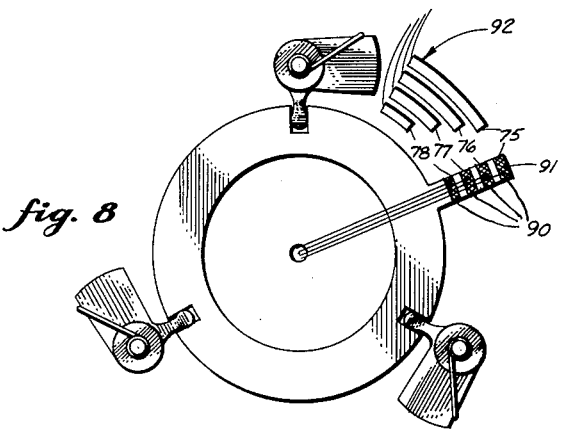
Figure 9:
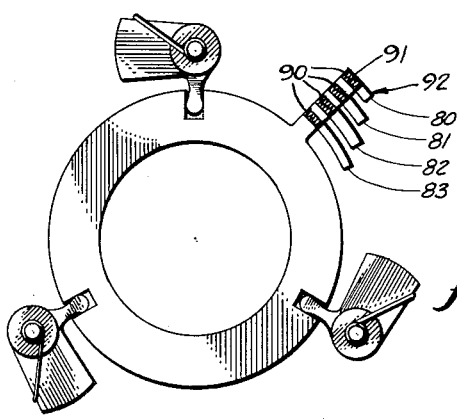
Figure 10:
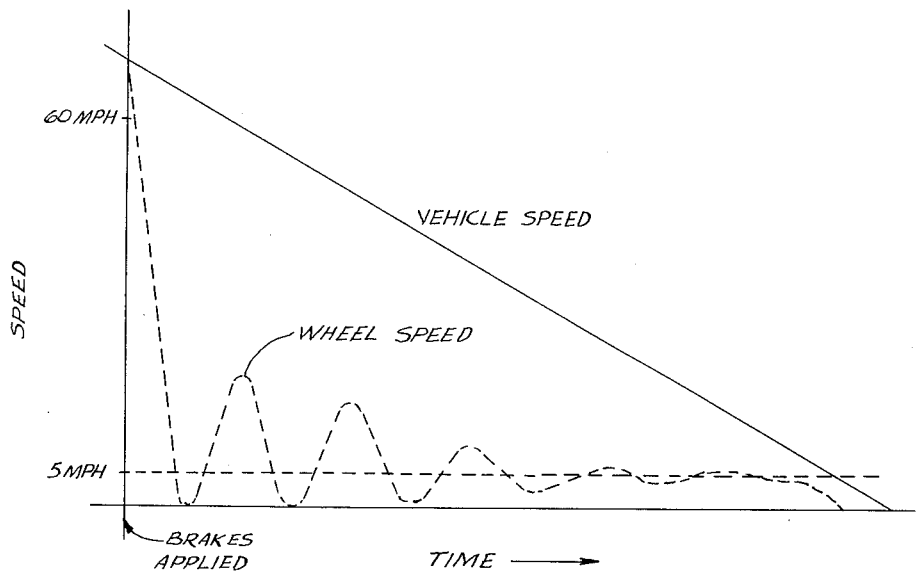

These and other objects of the invention may become more readily apparent from the following detailed description taken from the accompanying drawings, in which:

FIG. 1 is a cross-sectional view of the invention.
FIG. 2 is a cross-sectional view taken along line 2—2 of FIG. 1.
FIG. 3 is a cross-sectional view taken along line 3—3 of FIG. 1; and
FIGS. 4, 5 and 6 are circuit diagrams illustrating the operation of the invention.
FIG. 7 is a circuit diagram of a graduated anti-skid system according to the invention.
FIG. 8 is a diagrammatic view of a wheel speed responsive device for use with the graduated system of FIG. 7.
FIG. 9 is a diagrammatic view of a vehicle speed responsive device for use with the graduated system of FIG. 7.
FIG. 10 is a curve showing the relationship of wheel speed to vehicle speed.

The invention will be described showing the principal mechanical operating elements mounted in the hub cap of a braked wheel. It should be well understood, however, that the operating elements may be mounted in other housings associated with the rotating wheel such as a hollow rotating axle commonly found in aircraft. Further the vehicle speed responsive device and its associated overrunning clutch may be operably connected to the vehicle speedometer or other mechanism whose rotation is related to wheel speed. Alternatively, the vehicle speed responsive device may be a simple direct driver flyweight operated switch having no overruning clutch and operated by a non-braked wheel which rolls over the ground and records vehicle speed, absolutely. It will also be appreciated that while a system for one wheel only will be described, identical systems will be applied to all braked wheels of the vehicle.

In FIG. 1 is shown a portion of a brake drum 10 with which brake shoes are associated for the application of braking pressure in a known manner. The brake drum 10 is fixed to a rotating support 11 rotatably mounted by a pair of bearings 12 and 13 to a fixed axle stub 14. Threaded lugs 15 are fixed to the brake drum and support, and project outwardly through the brake drum and support to receive the vehicle wheel, a portion of which is indicated at 16. The vehicle wheel is connected to the brake drum in the usual manner by nuts 17.

The hub cap of the wheel is indicated at 20 and has a cup-shaped housing member 21 concentrically mounted with respect to hub cap 20 to form a closed chamber within which the anti-skid elements are mounted.

A leaf spring conductor 22 is connected by an insulator 23 to the hub cap at one end thereof and has a brush 24 at the other end thereof. The brush 24 is held by the leaf spring 22 into engagement with a collector button 25 fixed to the axial stub 14 by an insulator 26. An insulated conductor 27 passing through a bore 28 in the axial stub 14 connects the collector button 25 to the circuit of a solenoid (FIGS. 4–6) which operates the brake release, the other side of the solenoid being connected through a power source to ground.

It can be observed from FIG. 1 that the application of hub cap 20, carrying the anti-skid mechanism element, to the wheel of the vehicle automatically connects the anti-skid mechanism into its circuit through the connection to the collector button 25 by the spring 22 and brush 24.

It will be appreciated that the mechanism is shown in association with the front wheel of a vehicle and that minor modifications of the arrangement of the conductor 27, including a slip ring takeoff in the axle housing, will permit the application of the invention to the rear wheels of the vehicle or to other types of wheel mountings.

*Wheel Speed Responsive Device*

Two principal sub mechanisms are contained within the housing 21. The first of these is the flyweight device which detects wheel speed and can best be understood by reference to FIGS. 1 and 2. The device consists of a rotating ring or plate 30 which is supported by L-shaped flyweights 31 having projections 32 which project into slots 33 in the periphery of the ring 30. The ring has a movable contact 34 fixed to but insulated from the ring 30. A conductor 35 is connected to the contact 34 and passes through a bore 36 in a stub shaft 37 at the center of the mechanism. The brush 34 cooperates with a contact 38 fixed on the hub cap. The contact 38 is insulated from the hub cap 20 by the insulator 23 and connects the conductor 35 to the leaf spring conductor 22.

Each L-shaped flyweight 31 is biased clockwise by coil springs 40 having extensions 41 bearing against the flyweight. It can be seen from FIG. 2 that the springs 40, urging the flyweights clockwise, will, through the engagement of projections 32 with slots 33 of the ring 30 urge the ring in a counter-clockwise direction. Accordingly, when the wheel is no longer rotating the spring biased flyweights urge the contact 34 into engagement with the contact 38. When wheel speed is sufficiently great that the centrifugal force on the flyweights can overcome the force of the spring (corresponding to five miles per hour, for example) the flyweights will rotate counter-clockwise thereby rotating the ring 30. The clockwise rotation of the ring 30 causes the separation of contact 34 from contact 38.

*Vehicle Speed Responsive Device*

The second sub-assembly can be best understood by reference to FIGS. 1 and 3. The function of the second subassembly is to detect vehicle speed and to effect closing of contacts when vehicle speed is in excess of a predetermined amount, for example 10 miles an hour. The operation of the vehicle speed detecting assembly is similar to that of the wheel speed detecting assembly described in connection with FIG. 2 but differs therefrom in the connection of the sub-assembly to the stub shaft 37 by means of an overrunning clutch.

More specifically, the vehicle speed detecting assembly includes a plate 45 mounted by bearings 46 to stub shaft 37. The plate 45 has an annular integral sleeve 47 having ratchet teeth 48 at the inner extremity thereof. A pawl 50 pivoted on hub cap 20 is biased into engagement with the ratchet teeth 48 by a spring 51. The relationship of the pawl and ratchet teeth is such that rotation of the wheel for forward vehicle movement effect positive rotary drive of the plate 45 in a clockwise direction as viewed in FIG. 3 by means of the ratchet and pawl. If the wheel speed should be abruptly reduced the plate 45 will continue with its rotation at approximately vehicle speed.

A plurality of L-shaped flyweights 52 are pivotally mounted to the plate 45 and are spring biased in a counterclockwise direction by coil springs 53 having extensions 54 bearing against the flyweights. Each flyweight has a projection 55 which is received in a slot 56 in a ring 57 rotatably mounted on plate 45.

The ring 57 carries a movable contact 58 which is engageable with a contact 60 fixed by an insulator 61 to the plate 45. The fixed contact is connected by leaf spring conductor 62 and brush 63 to a collector 64 which is in turn connected to the conductor 35. The contact 58 will connect the fixed contacts 60 to ground when the two contacts are in engagement.

The contacts 58 and 60 are normally urged out of engagement by the spring biased flyweights 52. The flyweights are urged in a counter-clockwise direction tending to cause the ring 57 to move in a clockwise direction. When the speed of the vehicle exceeds a predetermined amount, for example 10 miles an hour, the centrifugal force acting on the flyweights will drive the contact 58 into engagement with the fixed contact 60.

*Operation*

The operation of the invention may best be understood by reference to the circuit diagram of FIGS. 4, 5 and 6. In addition to the switch elements of the sub-assemblies previously described, the circuit diagram shows a power source 70, a main switch 71, and a solenoid 72 all in series with the sub-assembly contacts 34, 38 and 58, 60. The solenoid 72, when energized, acts upon a mechanism which will effect the release of the brakes. Depending upon the type of brake system to which the invention is applied, the mechanisms acted upon by the solenoid may differ. The mechanism in the present embodiment is diagrammatically illustrated as a valve 73 connected in the fluid pressure line 74 of the brakes. The valve will function to release the application of fluid pressure to the brake when the solenoid is energized.

It can be seen that the contacts of the sub-assemblies are connected in series so that for the anti-skid mechanism to effect the release of the brakes, both switches must be closed as shown in FIG. 5. This condition exists when the wheel speed has dropped below 5 miles an hour for example and the vehicle speed is in excess of 10 miles an hour for example.

If the vehicle speed is high and the wheel speed is above the predetermined minimum, the brakes will have normal application the anti-skid mechanism will be of no effect. This condition is illustrated in FIG. 4. Under these circumstances there is no need for the anti-skid mechanism, for the wheel is turning, thereby constantly presenting dry rubber to the highway surface and providing a high coefficient of friction between the tire and the highway.

FIG. 6 illustrates a second condition in which the anti-skid mechanism is ineffective. In this condition, the vehicle speed, as indicated by the condition of contacts 58 and 60, is below the predetermined minimum, for example 10 miles an hour, so that the contacts are maintained open by the spring pressure on the flyweights.

Under these circumstances no anti-skid mechanism is necessary for the vehicle speed is so slow that no uncontrollable skidding is possible.

Graduated Anti-Skid System

FIG. 7 illustrates a refinement in the anti-skid system, the refinement embodying the principle of the operation described above. The refinement has application to any ground engaging vehicle, but, for convenience will be described with particular reference to the wheel brakes of an aircraft.

In this embodiment, instead of using the sub-assembly as shown in FIG. 3, vehicle speed can be measured directly by fixing a similar flyweight arrangement directly on the nose wheel of the aircraft. The sub-assembly of FIG. 3, of course, can be utilized but it is believed that greater accuracy of operation can be effected by using the direct drive of the aircraft third wheel to measure the ground speed of the aircraft.

A plurality of flyweight assemblies may be utilized to detect downwardly graduated stages of vehicle speed and wheel speed or alternatively one assembly for detecting the vehicle speed and one assembly for detecting wheel speed may be used, each assembly having a plurality of contacts by which the downwardly graduated stages of speed are detected (see FIGS. 8 and 9 to be described below). By way of example, the main wheel to which the brakes are applied has four contacts 75, 76, 77 and 78 which are closed when wheel speed falls below 140, 80, 25 and 5 knots respectively. The vehicle speed detector for example the nose wheel governor has contacts 80, 81, 82 and 83 which close when the vehicle speed is above 170, 110, 60 and 10 knots respectively. It will be appreciated that these speed designations will vary with differing types and speeds of aircraft. A power source 84 and a solenoid 85 which when energized effects the release of the brakes are employed.

The operation of the invention as illustrated in the circuit of FIG. 7 is as follows:

If as the plane comes in for a landing at its initial contact with the ground at a speed in excess of 170 knots, all of the contacts 80 through 83 will be closed. When brakes are applied, if the wheel speed is only slightly below the vehicle speed and is above 140 knots, the switches 75–78 will remain open, the solenoid 86 will remain de-energized and brakes will be normally applied. However, should brake locking occur and the braked wheel speed fall below 140 knots and the nose wheel speed remain above 170 knots contact 75 will close thereby completing a circuit through closed contacts 80 energizing the solenoid 85 and effecting release of the brakes.

As the speed of the aircraft is reduced below 170 knots the contact 80 will open but contacts 81, 82 and 83 will remain closed. If the braked wheels tend to lock so that their speed falls below 80 knots while the vehicle speed remains in excess of 110 knots, the circuit to the solenoid 85 will be again closed through contacts 76 and 81. Similar operations occur with respect to contacts 77 and 82 and contacts 78 and 83 with corresponding reductions in speed of operation.

Thus, there is a downwardly graduated application of the brakes so that the wheel speed more closely approaches the vehicle speed, whereby a more satisfactory coefficient of friction between tire and surface is provided with a consequently improved braking.

The structure of the speed responsive mechanism described in FIGS. 1–3 may be easily modified to accommodate the circuit of FIG. 7. As shown in FIG. 8, to modify the mechanism for graduated speed detection the only principal change required would be to provide a series of spaced movable contacts 90 to the radially projecting contact stud 91 and to provide fixed arcuate contact bars 92 which will be contacted by the series of movable contacts 91. The lengths of the contact bars 92 are graduated as illustrated so as to provide the sequential closing of the contacts as described in connection with FIG. 7. In order to clarify the relationship of the structures of FIG. 8 which detects wheel speed and FIG. 9 which detects vehicle speed with respect to the circuit of FIG. 7, the contact bars 92 carry the numerals corresponding to the contacts of FIG. 7.

It should be understood that the wheel speed contact operator of FIG. 9 may be mounted on the wheel in association with an overrunning clutch as described in connection with FIGS. 1 and 3. Alternatively, the contact carrier of FIG. 9 may be mounted on a free running non-braking wheel such as the nose wheel of an aircraft or on a wheel added for that purpose to a ground vehicle.

The curves of FIG. 10 illustrate the manner of operation of the anti-skid mechanism. The solid line of FIG. 10 corresponds to vehicle speed which decreases substantially uniformly from a high speed at the time the brakes are applied to zero speed when the vehicle has been stopped. The broken line curve corresponds to wheel speed. The shape of the curve will of course vary depending upon the pressure applied to the brake and condition of the surface over which the vehicle is rolling. Assuming a slippery condition, it can be seen that the wheel speed drops sharply to zero when the brakes are applied. When the wheel speed decreases past the five mile per hour point on the curve, the anti-skid mechanism effects the release of the brakes in a manner described above. Thereafter the wheels begin to increase their speed of rotation until a wheel speed in excess of five mile per hour is attained. Thereafter, the anti-skid mechanism will operate to permit the reapplication of the brakes and the wheel speed will once again begin to decrease. The "hunting" characteristic of the curve, that is, the swinging of the wheel speed above and below the critical five mile per hour line occurs because of several inertia effects of the brake applying system. If all components of a braking system acted instantaneously, the curve of the wheel speed would drop to five mile per hour and would remain at that straight line until vehicle speed was reduced to ten mile per hour. However, because of the time required for the mechanical actuation of the solenoid and its associated valve and perhaps, more important, because of the time lag in building up pressure on the brakes, the "hunting" characteristic occurs. This however does not adversely affect the operation of the system.

Having described my invention, I claim:

1. An anti-skid system for vehicle wheel brakes comprising, a fluid pressure operated system for actuating said brakes, valve means in said system having a "release" position for releasing said fluid pressure to release said brakes, a solenoid operable when energized to move said valve to "release" position, a power source connected from ground to said solenoid, an electrical conductor passing from said solenoid through a wheel axle to a fixed point, a wheel hub cap, a pair of series connected switches on said hub cap and connected at one side to ground and at the other side to a brush engageable with said conductor fixed point, a wheel speed detector mounted on said hub cap and connected to one of said switches to close one of said switches when wheel speed is below a predetermined amount, vehicle speed detector rotatably mounted on said hub by an overrunning clutch and connected to the other of said switches to close the other of said switches only when the vehicle speed is above a predetermined amount.

2. An anti-skid system for vehicle wheel brakes comprising, a fluid pressure operated system for actuating said brakes, valve means in said system having a "release" position for releasing said fluid pressure to release said brakes, a solenoid connected to said valve and operable when energized to move said valve to "release" position, a power source connected at one side to ground for operating said solenoid, means for connecting said power source to said solenoid, said connecting means comprising an electrical conductor passing from said solenoid through a wheel axle to a fixed point, a wheel hub cap mounted on said wheel axle, a pair of series connected switches on said hub cap and connected at one side to ground and at the other side to a brush engageable with said conductor fixed point, a detector responsive only to wheel speed mounted on said hub cap and operable to close one of said switches when wheel speed is below a predetermined amount, detector responsive only to vehicle speed rotatably mounted on said hub cap by an overrunning clutch and operable to close the other of said switches only when the vehicle speed is above a predetermined amount.

3. An anti-skid system for vehicle wheel brakes comprising, a fluid pressure operated system for actuating said brakes, valve means in said system having a "release" position for releasing said fluid pressure to release said brakes, a solenoid connected to said valve and operable when energized to move said valve to "release" position, a power source for operating said solenoid means for connecting said power source to said solenoid, said means comprising, an electrical conductor passing from said solenoid through a wheel axle to a fixed point, a wheel hub cap mounted on said wheel axle, a pair of series connected switches, at least one of said switches being mounted on said hub cap and connected to a brush engageable with said conductor fixed point, a detector responsive only to wheel speed mounted on said hub cap and operable to close said one switch when wheel speed is below a predetermined amount, and a detector responsive only to vehicle speed operable to close the other of said switches only when the vehicle speed is above a predetermined amount, whereby when both said switches are closed by said detectors, said solenoid will be energized by said power source.

4. In an anti-skid system for vehicle wheel brakes having an electrically operated mechanism for releasing said brakes, a wheel mounted detector device for controlling said releasing mechanism comprising, a fixed plate having a first fixed contact mounted thereon, a wheel speed detector plate rotatably mounted with respect to said fixed plate and having a first movable contact mounted thereon for engagement with said fixed contact, flyweights movably mounted on said fixed plate and engageable with said rotatable plate for moving said rotatable plate to open said contacts when wheel speed is above a predetermined amount, resilient means normally urging said contacts into engagement, a second rotatable plate having a second contact fixed thereon, an overrunning clutch for connecting said rotatable plate to a wheel to be rotated by said wheel when the vehicle is moving forward, a vehicle speed detector plate rotatably mounted on said second rotatable plate and having a second movable contact mounted thereon, flyweights movably mounted on said second rotatable plate and engageable to move said vehicle speed detector plate to close said contacts when wheel speed is above a predetermined amount, resilient means normally urging said contacts out of engagement, and means for connecting said contacts in series with said releasing mechanism.

5. In an anti-skid system for vehicle wheel brakes, a wheel mounted detector device comprising, a fixed plate having a first fixed contact mounted thereon, a wheel speed detector plate rotatably mounted with respect to said fixed plate and having a first movable contact mounted thereon for engagement with said fixed contact, flyweights movably mounted on said fixed plate and engageable with said rotatable plate for moving said rotatable plate to open said contacts when wheel speed is above a predetermined amount, resilient means normally urging said contacts into engagement, a second rotatable plate having a second contact fixed thereon, an overrunning clutch for connecting said second rotatable plate to a wheel to be rotated by said wheel when the vehicle is moving forward, a vehicle speed detector plate rotatably mounted on said second rotatable plate and having a second movable contact mounted thereon, flyweights movably mounted on said second rotatable plate and engageable to move said vehicle speed governor plate to close said contacts when wheel speed is above a predetermined amount, and resilient means normally urging said contacts out of engagement.

6. In an anti-skid system for vehicle wheel brakes, a wheel mounted detector device comprising, a fixed plate having a first fixed contact mounted thereon, a wheel speed detector plate rotatably mounted with respect to said fixed plate and having a first movable contact mounted thereon for engagement with said fixed contact, L-shaped flyweights pivotally mounted on said fixed plate and having one leg thereof engageable with said rotatable plate for moving said rotatable plate to open said contacts when wheel speed is above a predetermined amount, resilient means normally urging said contacts into engagement, a second rotatable plate having a second contact fixed thereon, an overrunning clutch for connecting said second rotatable plate to a wheel to be rotated by said wheel when the vehicle is moving forward, a vehicle speed detector plate rotatably mounted on said second rotatable plate and having a second movable contact mounted thereon, L-shaped flyweights pivotally mounted on said second rotatable plate and having one leg thereof engageable to move said vehicle speed detector plate to close said contacts when wheel speed is above a predetermined amount, and resilient means normally urging said contacts out of engagement.

7. An anti-skid system for vehicle wheels comprising, a fluid pressure operated system for actuating said brakes, valve means in said system having a "release" position for relieving said fluid pressure to release said brakes, electromagnetic means operable when energized to move said valve to "release" position, a power source connected from ground to said electromagnetic means, an electrical conductor passing from said electromagnetic means through a wheel axis to a fixed location, a pair of series connected switches on said wheel and connected at one side to ground and at the other side to a brush engageable with said conductor fixed location to maintain electrical contact therewith during operation of said anti-skid system, a wheel speed detector mounted on said wheel and connected to one of said switches to close one of said switches when said wheel speed is below a predetermined amount, a vehicle speed detector rotatably mounted on said wheel by an overrunning clutch and connected to the other of said switches to close the other of said switches only when the wheel speed is above a predetermined amount.

References Cited in the file of this patent

UNITED STATES PATENTS

| | | |
|---|---|---|
| 2,115,534 | Nash | Apr. 26, 1938 |
| 2,515,729 | Morrison | July 18, 1950 |
| 2,753,475 | Curl | July 3, 1956 |
| 2,907,607 | Williams | Oct. 6, 1959 |
| 2,920,924 | Reswick et al. | Jan. 12, 1960 |
| 2,947,579 | Woodworth | Aug. 2, 1960 |